(12) United States Patent
Minowa et al.

(10) Patent No.: US 6,474,560 B2
(45) Date of Patent: Nov. 5, 2002

(54) THERMAL EXPANSION VALVE (75) Inventors: Masakatsu Minowa, Tokyo (JP); Kazuhiko Watanabe, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 09/901,007

(22) Filed: Jul. 10, 2001

(65) Prior Publication Data

US 2002/0023966 A1 Feb. 28, 2002

(30) Foreign Application Priority Data

Jul. 10, 2000 (JP) ........................................ 2000-208595

(51) Int. Cl.$^7$ ........................... G05D 27/00; F25B 41/04
(52) U.S. Cl. ....................................... 236/92 B; 62/225
(58) Field of Search ........................... 62/225; 236/92 B (56) References Cited

U.S. PATENT DOCUMENTS 3,998,425 A * 12/1976 Braucksiek ............. 251/129.16

* cited by examiner

Primary Examiner—William E. Tapolcai
(74) Attorney, Agent, or Firm—Rader, Fishman & Grauer PLLC (57) ABSTRACT

Reference 100' refers to a heat-sensing driven member constituting a thermal expansion valve formed by a stainless steel material and the like and having in the inside thereof an adsorbent 40, with a collar 100'a formed to the outside of the opening 100'b of the heat-sensing driven material 100'. A protrusion 100'c and a groove 100'd is formed to said collar 100'a in the downward direction of the drawing. Said protrusion 100'c and said groove 100'd are formed to the whole perimeter of said collar 100'a. Moreover, a diaphragm 82a formed for example of stainless steel material is inserted to said heat-sensing driven member 100' through an opening 82b formed to the center area thereof until it contacts said protrusion 100'c, and said diaphragm 82a is fixed to said heat-sensing driven member 100'. As a result, the diaphragm 82a is welded by said protrusion 100'c between said collar 100'a and said support member 82'a. The end of the diaphragm 82a is sandwiched between housings 81 and 91 and fixed to position by welding.

8 Claims, 7 Drawing Sheets

PRIOR ART

Fig. 5

PRIOR ART

Fig. 6

PRIOR ART

Fig. 7(a)

PRIOR ART

Fig. 7(b)

THERMAL EXPANSION VALVE

FIELD OF THE INVENTION

The present invention relates to a thermal expansion valve used in a refrigeration cycle.

DESCRIPTION OF THE RELATED ART

The example of a thermal expansion valve conventionally used in a refrigeration cycle is disclosed in Japanese Patent Laid-Open Publication No. 5-322380.

Figure 5:
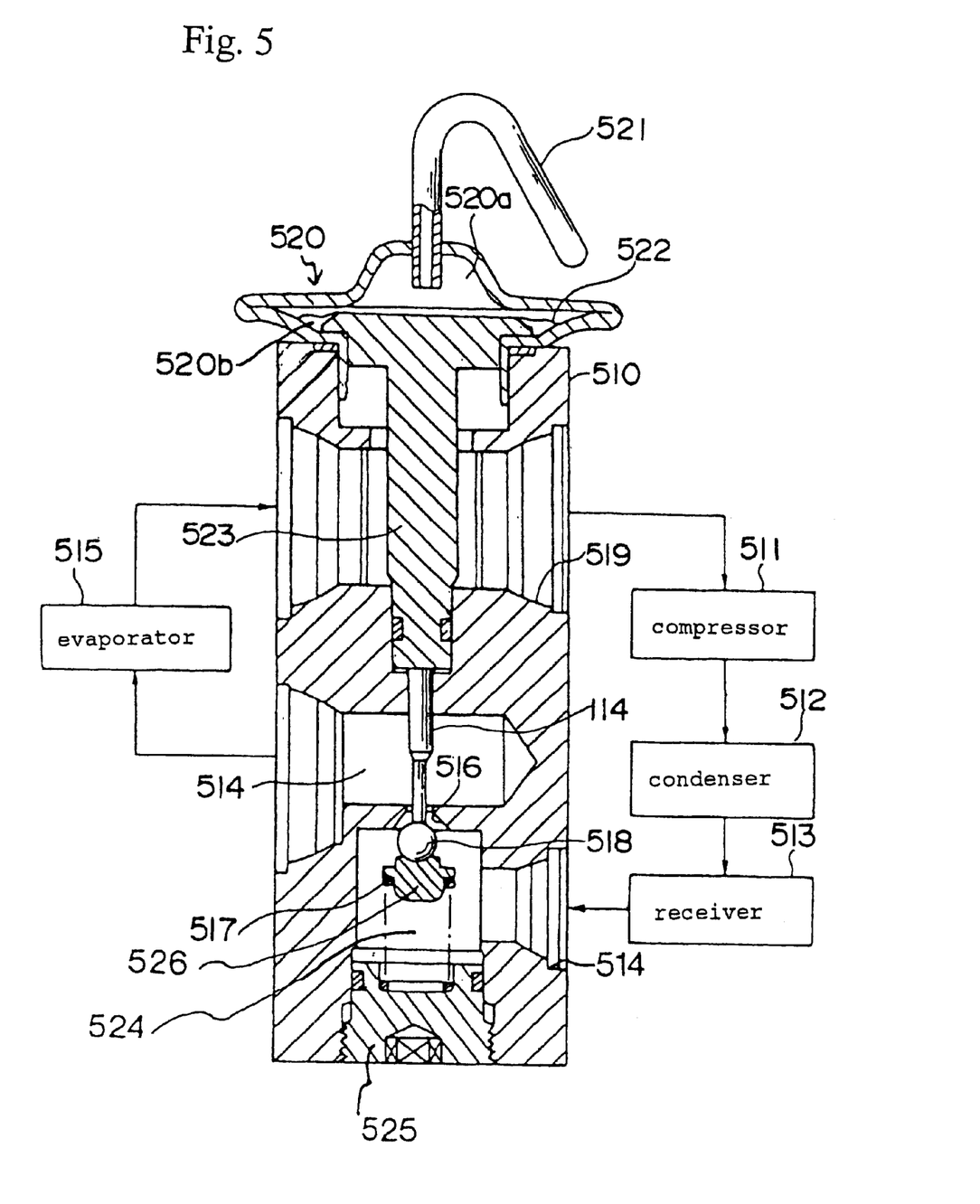
FIG. 5 is a cross-sectional view showing the prior-art thermal expansion valve.

In FIG. 5, a prism-shaped valve body 510 comprises a first refrigerant passage 514 including an orifice 516, and a second refrigerant passage 519, mutually independent from one another. One end of the first refrigerant passage 514 is communicated to the entrance of an evaporator 515, and the exit of the evaporator 515 is communicated through the second refrigerant passage 519, a compressor 511, a condenser 512 and a receiver 513 to the other end of the first refrigerant passage 514. A bias means 517 which is a bias spring biasing a sphere-shaped valve means 518 is formed to a valve chamber 524 communicated to the first refrigerant passage 514, and the valve means 518 is driven toward or away from the orifice 516. Further, the valve chamber 524 is sealed by a plug 525, and the valve means 518 is biased through a support member 526. A power element 520 including a diaphragm 522 is fixed to the valve body 510 adjacent to the second refrigerant passage 519. An upper chamber 520a formed to the power element 520 defined by the diaphragm 522 is maintained airtight, with temperature-corresponding working fluid filled thereto.

A small pipe 521 extending out from the upper chamber 520a of the power element 520 is used to degasify the upper chamber 520a and to fill the temperature-corresponding working fluid to the upper chamber 520a, before the end of the pipe is sealed. One large-diameter end of a valve drive member 523 functioning as the heat-sensing driven member positioned within the valve body 510 extending from the valve means 518 and penetrating through the second refrigerant passage 519 is positioned in the lower chamber 520b of the power element 520, contacting the diaphragm 522. The valve drive member 523 transmits the temperature of the refrigerant vapor exiting the evaporator 515 and flowing through the second refrigerant passage 519 to the temperature-corresponding working fluid filled to the upper chamber 520a of the power element 520, which generates a working gas with a pressure corresponding to the transmitted temperature. The lower chamber 520b is communicated to the second refrigerant passage 519 through the space formed around the valve drive member 523 within the valve body 510.

Accordingly, the diaphragm 522 of the power element 520 uses the valve drive member 523 to adjust the valve opening of the valve means 518 against the orifice 516 (that is, the amount of flow of liquid-phase refrigerant entering the evaporator) according to the difference in pressure of the working gas of the temperature-corresponding working fluid filling the upper chamber 520a and the pressure of the refrigerant vapor exiting the evaporator 515 within the lower chamber 520b, under the influence of the biasing force of the bias means 517 provided to the valve means 518.

Moreover, the other end of the valve drive member 523 contacts the shaft 114, and thereby drives the valve means 518 via the shaft 114.

According to the above-mentioned prior-art thermal expansion valve, the power element 520 is exposed to external atmosphere, and the temperature-corresponding driving fluid in the upper chamber 520a receives influence not only from the temperature of the refrigerant exiting the evaporator and transmitted by the valve drive member 523 but also from the external atmosphere, especially the engine room temperature. Moreover, the above valve structure often caused a so-called hunting phenomenon where the valve responds too sensitively to the refrigerant temperature at the exit of the evaporator and repeats the opening and closing movement of the valve means 518. The hunting phenomenon is caused for example by the structure of the evaporator, the method of positioning the pipes of the refrigeration cycle, the method of using the expansion valve, and the balance with the heat load.

Figure 6:
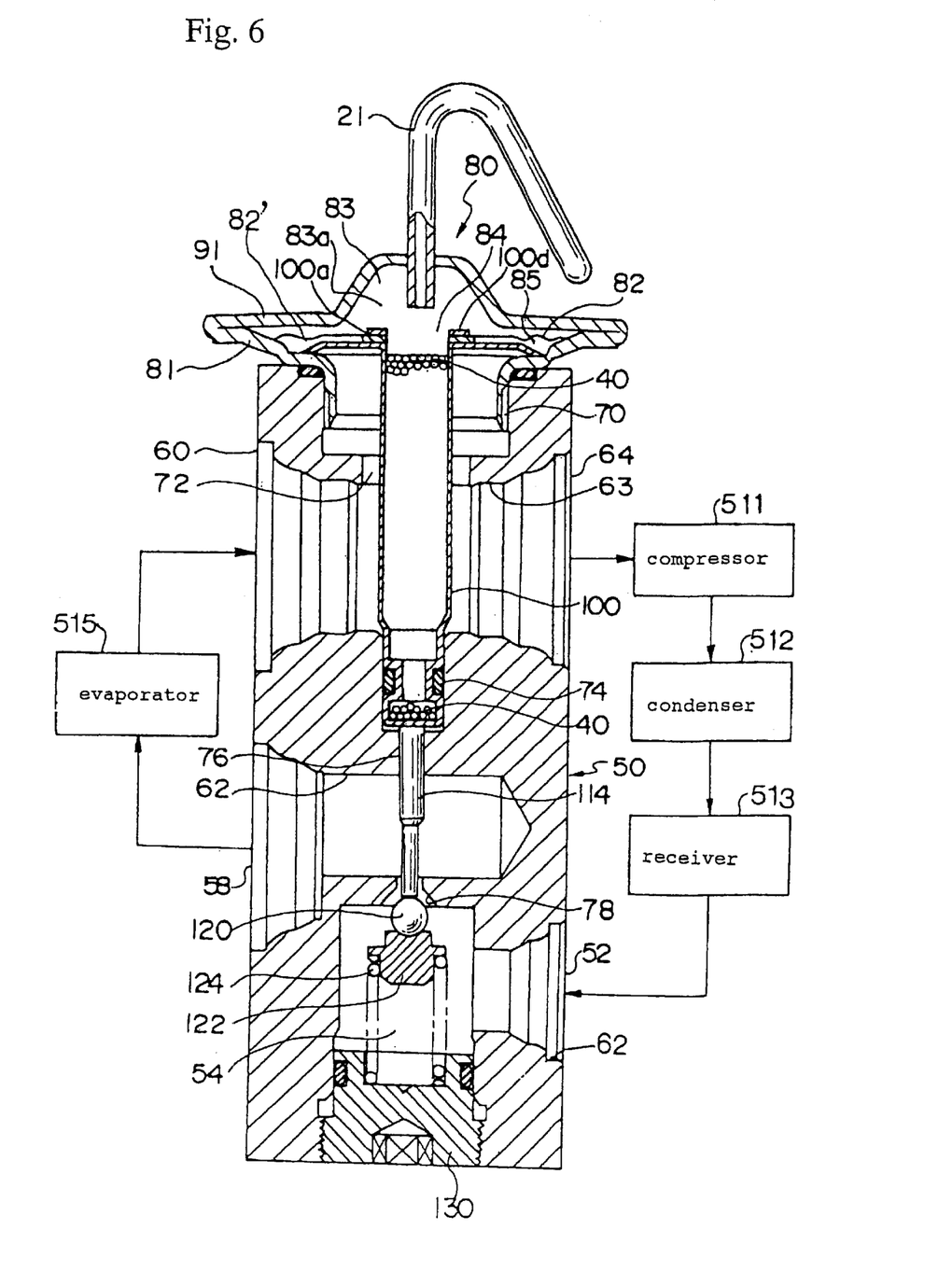
FIG. 6 is a cross-sectional view showing yet another prior-art thermal expansion valve.

Conventionally, an adsorbent such as an activated carbon is utilized as means for preventing such hunting phenomenon. FIG. 6 is a cross-sectional view showing the thermal expansion valve disclosed in the above prior-art publication utilizing an adsorbent, the structure of which is basically similar to the prior-art thermal expansion valve of FIG. 5, except for the structure of the diaphragm and the structure of the valve drive member that functions as temperature sensing/pressure transmitting member. According to FIG. 6, the thermal expansion valve comprises a prism-shaped valve body 50, and the valve body 50 comprises a port 52 through which the liquid-phase refrigerant flowing through a condenser 512 and entering from a receiver tank 513 travels into a first passage 62, a port 58 sending the refrigerant traveling through the first passage 62 out towards an evaporator 515, an entrance port 60 of a second passage 63 through which the gas-phase refrigerant exiting the evaporator enters, and an exit port 64 through which the refrigerant exits toward the compressor 511.

The port 52 through which the refrigerant is introduced is communicated to a valve chamber 54 positioned on the center axis of the valve body 50, and the valve chamber 54 is sealed by a nut-type plug 130. The valve chamber 54 is communicated through an orifice 78 to a port 58 through which the refrigerant exits toward the evaporator 515. A sphere-shaped valve means 120 is mounted to the end of a small-diameter shaft 114 that penetrates the orifice 78, and the valve means 120 is supported by a support member 122. The support member 122 biases the valve means 120 toward the orifice 78 using a bias spring 124. The area of the flow path of the refrigerant is adjusted by varying the space formed between the valve means 120 and the orifice 78. The refrigerant sent out from the receiver 514 expands while passing through the orifice 78, and travels through the first passage 62 and exits from the port 58 toward the evaporator. The refrigerant exiting the evaporator enters from the port 60, and travels through the second passage 63 and exits from the port 64 toward the compressor.

The valve body 50 is equipped with a first hole 70 formed from the upper end portion along the axis, and a power element portion 80 is mounted to the first hole using a screw portion and the like. The power element portion 80 includes housings 81 and 91 that constitute the heat sensing portion, and a diaphragm 82 that is sandwiched between these housings and fixed thereto through welding. The upper end portion of a heat-sensing driven member 100 is welded onto a round hole or opening formed to the center area of the diaphragm 82 together with a diaphragm support member 82', as shown in FIG. 7. The diaphragm support member 82' is supported by the housing 81.

A two-phase refrigerant of gas and liquid that is either identical to the refrigerant flowing within passage 62 or having similar characters thereto is sealed inside the housing 81, 91 as a temperature-corresponding working fluid, which is sealed thereto by the small tube 21. Further, a plug body welded to the housing 91 can be used instead of the small tube 21. The diaphragm 82 divides the space within the housing 81, 91 and defines an upper chamber 83 and a lower chamber 85.

The heat-sensing/pressure transmitting member 100 is constituted of a hollow pipe-like member exposed to the second passage 63, with an adsorbent stored to the interior thereof. The upper end of the heat-sensing driven member 100 is communicated to the upper chamber 83, defining a pressure space 83a by the upper chamber 83 and the hollow portion 84 of the heat-sensing driven member 100. The pipe-shaped heat-sensing driven member 100 penetrates through a second hole 72 formed on the axis of the valve body 50, and is inserted to a third hole 74. A gap is formed between the second hole 72 and the heat-sensing driven member 100, through which the refrigerant within the passage 63 is introduced to the lower chamber 85 of the diaphragm.

The heat-sensing/pressure transmitting member 100 is slidably inserted to the third hole 74, and the end thereof is connected to one end of the shaft 114. The shaft 114 is slidably inserted to a fourth hole 76 formed to the valve body 50, and the other end thereof is connected to the valve means 120.

According to this structure, the adsorbent functioning as a time-constant retardant works as follows. When a granular activated carbon is used as the adsorbent 40, the combination of the temperature-corresponding working fluid and the adsorbent 40 is an absorption-equilibrium type, where the pressure can be approximated by a linear expression of the temperature within a considerably wide temperature range, and the coefficient of the linear expression can be set freely according to the amount of granular activated carbon used as the adsorbent. Therefore, the user of the thermal expansion valve can set the characteristic of the thermal expansion valve at will.

Accordingly, it takes a relatively long time to set the adsorption-equilibrium-type pressure-temperature equilibrium state when the temperature of the refrigerant vapor flowing out from the exit of the evaporator 515 is either rising or falling. In other words, the work efficiency of an air conditioning device is improved by stabilizing the performance of the air conditioning device capable of suppressing the sensitive operation of the thermal expansion valve caused by the influence of disturbance which may lead to the hunting phenomenon, by increasing the time constant.

FIG. 7 is a cross-sectional view explaining the structure where the diaphragm 82 is welded onto the opening portion formed to the upper end of the heat-sensing driven member 100. In FIG. 7, the diaphragm 82 is a stainless steel formed into a concentrical corrugated shape so that it can be deformed easily. Moreover, an opening is formed to the center portion thereof, and a rising portion 82a for guiding a reinforcement member is equipped to the upper area thereof in the drawing. Even further, the heat-sensing driven member 100 made of stainless steel has its end portion being formed into a collar, and a ring-like protrusion 100c together with a relief groove 100b is formed to the whole perimeter of the center area of the upper surface in the collar portion 100a, as shown in the drawing.

Figure 7A:
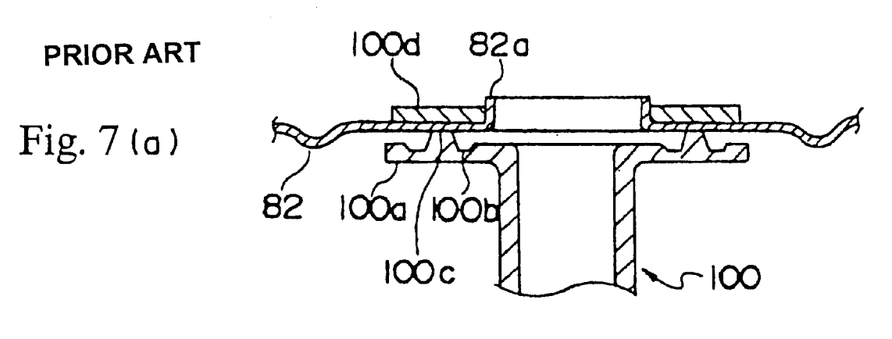
FIG. 7 is a drawing showing the main portion of the thermal expansion valve of FIG. 6.
Figure 7B:
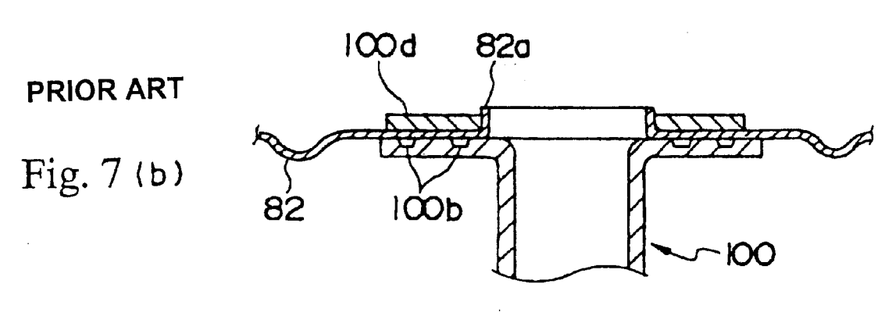

Further, a plate-shaped ring-like reinforcement member 100d is fit to the outer perimeter of the center rising portion 82a of the diaphragm 82 as shown in FIG. 7(a), and the reinforcement member is mounted on the protrusion 100c so that the reinforcement member 100d and the protrusion 100c are positioned in concentrical manners. Then, the member is pressurized and fixed in position using electrodes (not shown), and electric current is applied instantly to the upper and lower electrodes thereby welding the protrusion 100c as shown in FIG. 7(b). According to this step, the reinforcement member 100d is also welded to the diaphragm 82.

According to this structure, in order to prevent a gap from being generated between the diaphragm 82 and the flat surface of the collar of the heat-sensing driven member 100 when the protrusion 100c is melded, and to prevent the decreased strength portion from becoming the diaphragm fulcrum, a relief groove 100b having enough volume to store the melted metal is formed to both sides of the base portion of the protrusion 100c.

A stopper member 82' that supports the diaphragm 82 fixed to the heat-sensing driven member 100 is press-fit to the heat-sensing driven member through an opening formed thereto that is concentrical with the diaphragm 82, and contacts the collar portion 100a. The diaphragm 82 fixed between the collar 100a and the reinforcement member 100d through welding has its peripheral area sandwiched between the housing 81 and 91, with each end also being welded. Further, stainless steel material is used to form the housings 81, 91 and the reinforcement member 100d.

SUMMARY OF THE INVENTION

However, according to the prior-art expansion valve, the structure where a diaphragm constituting a power element is welded onto a heat-sensing driven member with a hollow portion requires a reinforcement member, and further requires a rising portion to be formed to the diaphragm. This requires a large number of parts to be assembled and increased number of assembly steps, which leads to increased manufacturing cost. Moreover, according to the prior art structure, the positioning of the diaphragm, the reinforcement member and the hollow heat-sensing driven member is somewhat unstable, and it is difficult to match the axes of the diaphragm, the reinforcement member and the hollow heat-sensing driven member accurately.

The present invention aims at solving the above-mentioned problems of the prior art expansion valve. The object of the present invention is to provide a thermal expansion valve capable of being assembled with ease and being manufactured at low cost, wherein the diaphragm is inserted to the hollow heat-sensing driven member before welding the diaphragm to the hollow heat-sensing driven member.

In order to achieve the above objects, the present invention provides a thermal expansion valve including a heat-sensing driven member with a hollow portion formed to the interior thereof and having a heat sensing function positioned inside a refrigerant passage extending from an evaporator to a compressor, and a diaphragm inserted to said heat-sensing driven member through an opening formed to the center thereof, said diaphragm constituting a power element portion for driving the heat-sensing driven member; wherein the heat-sensing driven member comprises a collar formed to the end of the opening of the hollow portion and a protrusion formed to the collar, and the protrusion is used to weld the collar and the diaphragm together.

According to the present invention, the diaphragm is inserted to the heat-sensing driven member until it contacts the collar portion, where the diaphragm is fixed to the heat-sensing driven member and the collar portion is welded to the diaphragm, thereby simplifying the axis-matching arrangement.

In a preferred embodiment, the heat-sensing driven member is equipped with a diaphragm support member inserted thereto concentrically with the diaphragm, and the diaphragm is welded onto position between the collar and the diaphragm support member using a protrusion.

In a more preferable embodiment, the protrusion is formed to the whole perimeter of the surface of the collar that comes into contact with the diaphragm.

Further, the present invention provides a thermal expansion valve including a heat-sensing driven member with a hollow portion formed to the interior thereof and having a heat sensing function positioned inside a refrigerant passage extending from an evaporator to a compressor, a diaphragm inserted to the heat-sensing driven member through an opening formed to the center thereof, said diaphragm constituting a power element portion for driving the heat-sensing driven member, and a support member inserted to the heat-sensing driven member through an opening formed thereto that is concentrical with the opening of said diaphragm so as to support the diaphragm; wherein the heat-sensing driven member comprises a collar formed to the end of the opening of the hollow portion, the support member comprises a protrusion formed near the opening formed thereto, and the protrusion is used to weld the diaphragm between the collar and the support member.

According to the above-mentioned thermal expansion valve, the diaphragm contacts the protrusion formed to the support member and fixed to the heat-sensing driven member, and the protrusion is used to weld the diaphragm to position between the collar and the support member.

In a more preferable embodiment, the protrusion is formed to the surface of the support member that comes into contact with the diaphragm.

Even further, the present invention provides a thermal expansion valve including a heat-sensing driven member with a hollow portion formed to the interior thereof and having a heat sensing function positioned inside a refrigerant passage extending from an evaporator to a compressor, a diaphragm inserted to the heat-sensing driven member through an opening formed to the center thereof, said diaphragm constituting a power element portion for driving the heat-sensing driven member, and a support member inserted to the heat-sensing driven member through an opening formed thereto that is concentrical with the opening of said diaphragm so as to support the diaphragm; wherein the heat-sensing driven member comprises a collar formed to the end of the opening of the hollow portion, the collar further having a protrusion formed thereto; the support member comprises a protrusion formed near the opening formed thereto; and the two protrusions are used to weld the diaphragm between the collar and the support member.

Further, according to the above-mentioned thermal expansion valve, the diaphragm fixed to the heat-sensing driven member contacts the protrusions formed to the collar and the support member, respectively, and is welded between the collar and the support member using the two protrusions.

According to yet another embodiment, the protrusions mentioned above are each formed to the whole perimeter of the surface of the collar and the surface of the support member that come into contact with the diaphragm, respectively.

According to the thermal expansion valve having the structures mentioned above, it is possible to suppress hunting and to control the amount of refrigerant transmitted to the evaporator without having to change the basic structures of the prior-art thermal expansion valve using the heat-sensing driven member having an adsorbent placed inside the hollow area formed thereto.

DETAILED DESCRIPTION OF PREFERRED EMBODIMENTS

Now, the embodiments of the present invention will be explained with reference to the drawings.

Figure 1:
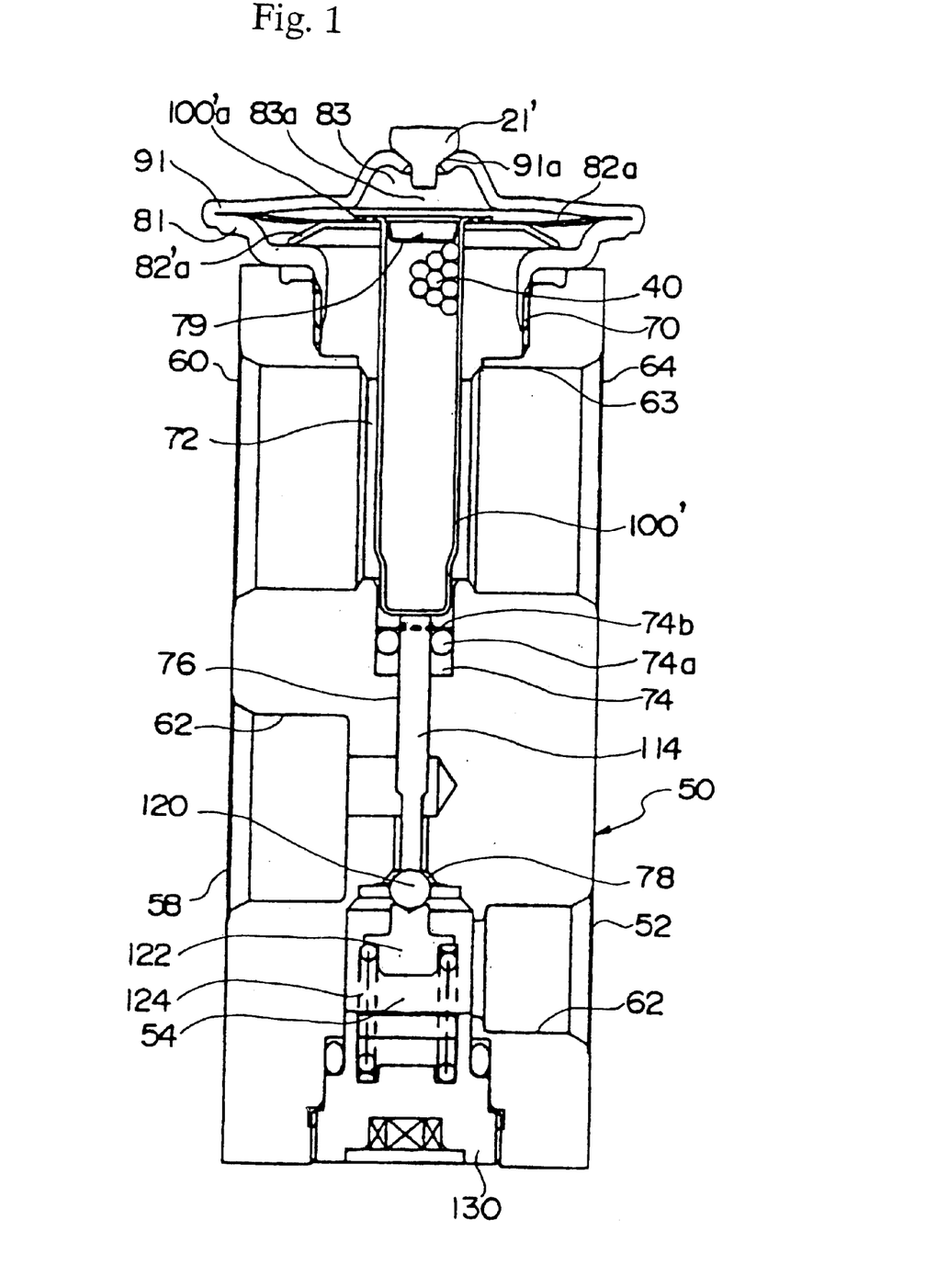
FIG. 1 is a cross-sectional view showing one embodiment of the thermal expansion valve according to the present invention.

FIG. 1 shows one embodiment of the thermal expansion valve according to the present invention. The basic structure and operation of the thermal expansion valve shown in the drawing is identical to that of the prior art thermal expansion valve, so the identical or equivalent members are provided with the same reference numbers as those in FIG. 6, and the explanations thereof are omitted. In FIG. 1, reference number 100' refers to a heat-sensing driven member formed for example of stainless steel material and to the interior of which is positioned an adsorbent. Further, as shown in FIG. 2(a), a collar 100'a is formed outside the opening 100'b of the heat-sensing driven member 100', and a protrusion 100'c and a groove 100'd are formed to the collar 100'a in the downward direction of the drawing.

The protrusion 100'c and the groove 100'd are formed around the whole perimeter of the collar 100'a.

Moreover, a diaphragm 82a formed for example of stainless steel material is inserted to the heat-sensing driven member 100' through an opening 82b formed to the center thereof so as to contact the protrusion 100'c, which is advanced to the direction of the arrow of FIG. 2(a) until it contacts the protrusion 100'c, and there the diaphragm 82a is fixed to the heat-sensing drive member 100'.

A support member 82'a made for example of stainless steel material for supporting the diaphragm 82a is inserted to the heat-sensing driven member 100'a in the direction of the arrow of FIG. 2(a) through an opening 82'b formed concentrically with the opening 82b of the diaphragm 82a until it contacts the diaphragm 82a. The protrusion 100'c and the support member 82'a are pressurized and fixed to one another at upper and lower electrodes (not shown) so that the support member is positioned concentric with the protrusion 100'c, and current is applied to these electrodes so that a so-called projection welding is performed, welding together the collar 100'a, the diaphragm 82a and the support member 82'a as shown in FIG. 2(b).

As a result, the diaphragm 82a is sandwiched between the collar 100'a and the support member 82'a, and is welded to the protrusion 100'c. The end portion of the diaphragm 82a is sandwiched between housings 81 and 91, and fixed to position by welding.

Figure 2:
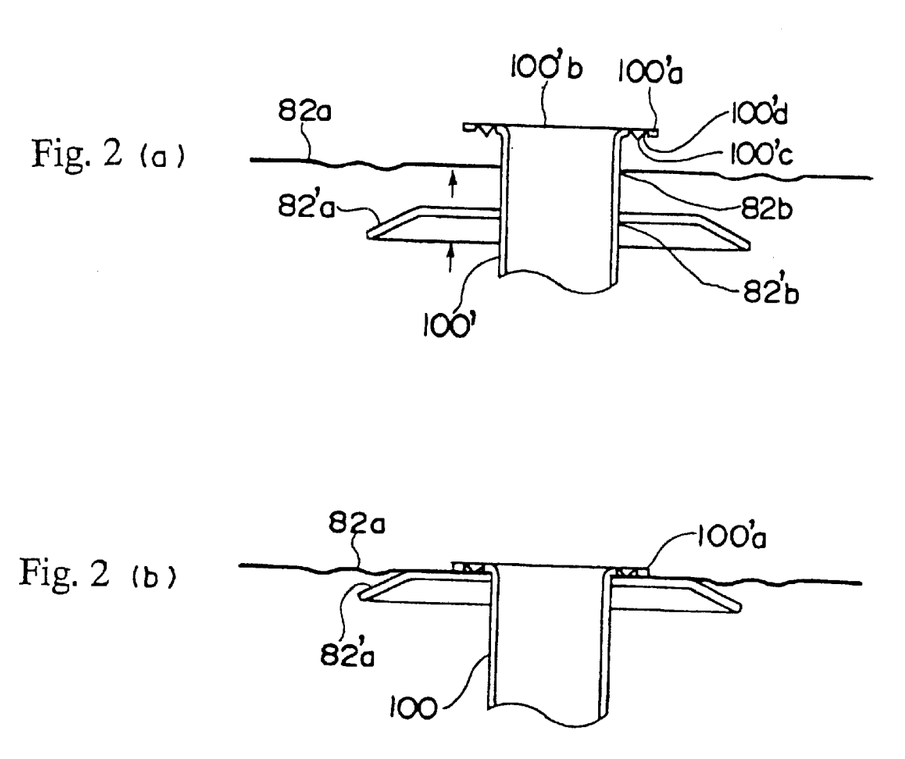
FIG. 2 is a drawing showing the main portion of the thermal expansion valve of FIG. 1.

According to this structure, the diaphragm 82'a is fixed to the heat-sensing driven member 100', so there is no unstableness when positioning the diaphragm 82'a and the axis of the diaphragm can be matched accurately and easily with the axis of the heat-sensing driven member 100'.

The above explanation on the present embodiment related to bonding the diaphragm collar and the support member by welding the members mutually, but the present invention is not limited to this example. For example, the diaphragm and the collar can be welded at first, and by press-fitting the support member to the heat-sensing driven member through the opening portion formed thereto until it contacts the diaphragm, the support member can be fixed to the heat-sensing driven member.

Further, according to the embodiment shown in FIG. 1, the evaporator, the compressor, the condenser and the receiver constituting the refrigerant cycle are omitted from the drawing. Reference 21' refers to a plug body made of stainless steel for sealing into an upper chamber 83 a predetermined refrigerant that functions as a temperature working fluid that drives the diaphragm 82a, and it is welded onto position so as to close the hole 91a formed to the housing 91. Reference 74a is an o-ring mounted to a shaft 114 within a third hole 74, 74b is a push nut that prevents the o-ring from moving, and 79 is a lid press-fit to the hollow portion of the heat-sensing driven member 100' that pushes down the adsorbent such as activated carbon positioned within the hollow portion.

Figure 3:
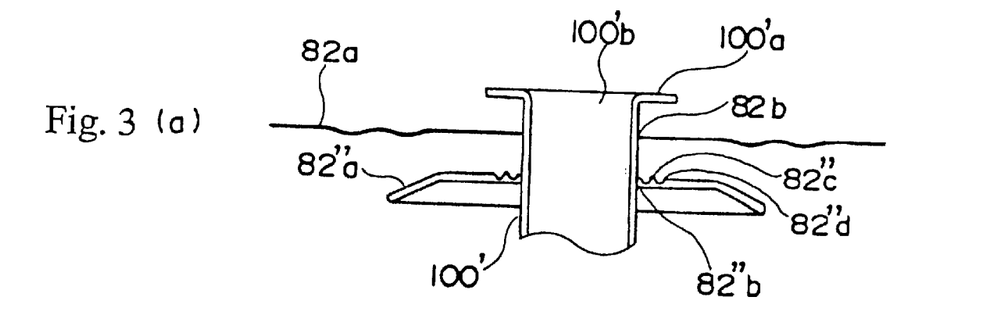
FIG. 3 is a cross-sectional view showing another embodiment of the main portion of the thermal expansion valve of FIG. 1.

FIG. 3 shows another embodiment of the thermal expansion valve according to the present invention, and only the main portion of the valve constituted by the heat-sensing driven member, the diaphragm and the support member is shown in FIG. 3. In the present embodiment as shown in (a), the diaphragm 82a is inserted to the center thereof to the heat-sensing driven member 100' through the opening 82b formed so as to contact the collar 100'a formed to surround the opening 100b of the heat-sensing driven member 100'. The supporting member 82"a comprises an opening 82"b formed concentrically as the opening 82b, and the whole perimeter of the opening 82"b is surrounded by a protrusion 82"c and a groove 82"d, and the member 82"a is inserted through the opening 82"b to the heat-sensing driven member 100' so as to support the diaphragm 82a, the protrusion 82"c contacting the diaphragm 82a. Moreover, a collar 100'a formed outside the opening of the heat-sensing driven member 100' is not provided with a protrusion or a groove.

Thereby the diaphragm 82a and the support member 82"a are fixed to the heat-sensing driven member 100', and the axes of the diaphragm 82a and the support member 82"a can be aligned accurately and easily. According to this structure, similar to the embodiment shown in FIG. 2, projection welding of the protrusion 82"c is performed using electrodes, thereby mutually welding the collar 100'a, the diaphragm 82a and the support member 82"a as shown in FIG. 3(b). As a result, the diaphragm 82a is sandwiched between the collar 100'a and the support member 82"a and welded thereto.

Figure 4:
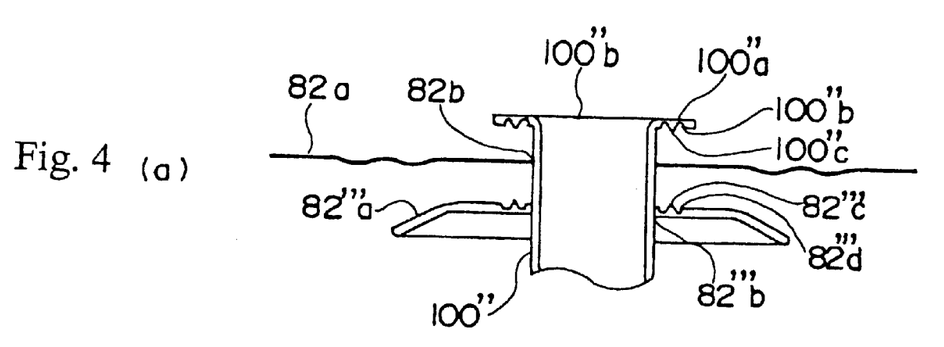
FIG. 4 is a cross-sectional view showing yet another embodiment of the main portion of the thermal expansion valve of FIG. 1.

FIG. 4 shows another embodiment of the thermal expansion valve according to the present invention, wherein only the main portion including the heat-sensing driven member, the diaphragm and the support member is shown. As shown in FIG. 4(a), a collar 100"a is formed outside the opening 100"b of the heat-sensing driven member 100", and a protrusion 100"c and a groove 100"d are formed downward in the drawing to the whole perimeter of the collar 100"a. Coming into contact with the protrusion 100"c is a diaphragm 82a that is inserted through an opening 82b formed to the center thereof to the heat-sensing driven member 100", and a support member 82'''a including a protrusion 82'''c protruding to the upper direction in the drawing and a groove 82'''d, which are formed to surround whole perimeter of the opening 82'''b formed concentrically with the opening 82b, is inserted via opening 82'''b to the heat-sensing driven member 100" so as to contact and support the diaphragm 82a. Thereby the diaphragm 82a and the support member 82'''a are fixed to the heat-sensing driven member 100", so the axis of the diaphragm 82a can be aligned with the axis of the support member 82'''a accurately and easily. According to this structure, the protrusion 100"c and the protrusion 82'''c are positioned concentrically and the protrusions are mutually pressurized and fixed, and upper and lower electrodes (not shown) are used to apply current thereto to perform a so-called projection welding, bonding together the collar 100'a, the diaphragm 82a and the support member 82'''a as shown in FIG. 4(b).

As explained above, the projection formed to the collar of the heat-sensing driven member and the projection formed to the support member further increases the resistance caused during the projection welding, and current is converged to the area, thereby modifying the welding conditions. As a result, the diaphragm 82a is welded onto position between the collar 100"a and the support member 821'a.

Further, in the embodiments shown in FIG. 3 and FIG. 4, the materials forming the heat-sensing driven member, the diaphragm and the support member are the same as those of the embodiment shown in FIG. 1.

As explained above, the thermal expansion valve according to the present invention includes a diaphragm constituting a power element, that is inserted and fixed to position through the opening formed thereto by a press-fit process on a heat-sensing driven member comprising a hollow portion. According to the present expansion valve, there is no need to prepare a special member for fixing the diaphragm to position, so the cost for manufacturing the valve is reduced, and there is no unstableness related to the positioning of the diaphragm, which enables the axis of the diaphragm to be aligned with the axis of the heat-sensing driven member accurately and easily before welding the diaphragm onto the collar of the heat-sensing driven member. Moreover, since the support member for supporting the diaphragm can also be inserted and fixed to the heat-sensing driven member through the opening formed thereto, the diaphragm can easily be welded to position between the collar and the support member.

The contents of Japanese patent application No. 2000-208595, including specification, claims and drawings are incorporated herein by reference.

We claim:

1. A thermal expansion valve, comprising:
   a heat-sensing driven member with a hollow portion formed to an interior thereof and having a heat sensing function positioned inside a refrigerant passage extending from an evaporator to a compressor, and
   a diaphragm having a centrally-located opening that receives said heat-sensing driven member therethrough, said diaphragm constituting a power element portion for driving said heat-sensing driven member; wherein
   said heat-sensing driven member includes a collar formed at an end of said hollow portion and a protrusion formed on said collar, and said protrusion is used to weld said collar and said diaphragm together.

2. A thermal expansion valve, comprising:

a heat-sensing driven member with a hollow portion formed to an interior thereof and having a heat sensing function positioned inside a refrigerant passage extending from an evaporator to a compressor, a diaphragm having a centrally located diaphragm opening that receives said heat-sensing driven member therethrough, said diaphragm constituting a power element portion for driving said heat-sensing driven member, and a support member having a support member opening formed therethrough that receives said heat-sensing driven member that is concentrical with the diaphragm opening of said diaphragm, the support member operative to support said diaphragm; wherein said heat-sensing driven member includes a collar formed at an end of said hollow portion and a protrusion formed on said collar, and said protrusion is used to weld said diaphragm between said collar and said support member.

3. A thermal expansion valve, comprising:

a heat-sensing driven member with a hollow portion formed to an interior thereof and having a heat sensing function positioned inside a refrigerant passage extending from an evaporator to a compressor, a diaphragm having a centrally-located diaphragm opening that receives said heat-sensing driven member therethrough, said diaphragm constituting a power element portion for driving said heat-sensing driven member, and a support member having a support member opening formed therethrough that receives said heat-sensing driven member that is concentrical with the diaphragm opening of said diaphragm, the support member operative to support said diaphragm; wherein said heat-sensing driven member includes a collar formed at an end of said hollow portion, said support member including a protrusion formed near said support member opening, and said protrusion is used to weld said diaphragm between said collar and said support member.

4. A thermal expansion valve, comprising:

a heat-sensing driven member with a hollow portion formed to an interior thereof and having a heat sensing function positioned inside a refrigerant passage extending from an evaporator to a compressor, a diaphragm having a centrally-located diaphragm opening that receives said heat-sensing driven member therethrough, said diaphragm constituting a power element portion for driving said heat-sensing driven member, and a support member having a support member opening formed therethrough that receives said heat-sensing driven member that is concentrical with the diaphragm opening of said diaphragm, the support member operative to support said diaphragm; wherein said heat-sensing driven member includes a collar formed at an end of said hollow portion, said collar having a collar protrusion formed thereon; said support member including a support member protrusion formed near said support member opening; and said collar and support member protrusions are used to weld said diaphragm between said collar and said support member.

5. A thermal expansion valve according to claim 1, wherein said protrusion is formed to a whole circumference of a surface of said collar that comes into contact with said diaphragm.

6. A thermal expansion valve according to claim 4, wherein said collar and support member protrusions formed to said collar and said support member are each formed to a whole circumference of the mutually opposing surfaces of said collar and said support member, respectively.

7. A thermal expansion valve according to claim 2, wherein said protrusion is formed to the whole circumference of the surface of said collar that comes into contact with said diaphragm.

8. A thermal expansion valve according to claim 3, wherein said protrusion is formed to the whole circumference of the surface of said support member that comes into contact with said diaphragm.

* * * * *